United States Patent
Piringer et al.

(10) Patent No.: US 10,947,125 B2
(45) Date of Patent: Mar. 16, 2021

(54) FURNACE AND METHOD FOR OPERATING A FURNACE

(71) Applicants: MAERZ OFENBAU AG, Zürich (CH); thyssenkrupp AG, Essen (DE)

(72) Inventors: Hannes Piringer, Beinwil am See (CH); Patrick Bucher, Schönenwerd (CH)

(73) Assignees: MAERZ OFENBAU AG, Zürich (CH); thyssenkrupp AG, Essen (DE)

( * ) Notice: Subject to any disclaimer, the term of this patent is extended or adjusted under 35 U.S.C. 154(b) by 0 days.

(21) Appl. No.: 16/081,334

(22) PCT Filed: Mar. 3, 2017

(86) PCT No.: PCT/EP2017/054987
§ 371 (c)(1),
(2) Date: Aug. 30, 2018

(87) PCT Pub. No.: WO2017/149110
PCT Pub. Date: Sep. 8, 2017

(65) Prior Publication Data
US 2019/0345037 A1    Nov. 14, 2019

(30) Foreign Application Priority Data
Mar. 4, 2016 (DE) ..................... 10 2016 103 937.3

(51) Int. Cl.
*C01F 11/06*     (2006.01)
*F27B 1/00*      (2006.01)
(Continued)

(52) U.S. Cl.
CPC .............. *C01F 11/06* (2013.01); *F27B 1/005* (2013.01); *F27B 1/04* (2013.01); *F27B 1/20* (2013.01); *F27B 1/24* (2013.01); *F27B 1/26* (2013.01)

(58) Field of Classification Search
CPC .................................. C01F 11/06; F27B 1/005
See application file for complete search history.

(56) References Cited

U.S. PATENT DOCUMENTS 3,771,946 A    11/1973    Hofer
4,031,183 A *  6/1977    Rourke .................. C01F 11/06
                                                    423/175
(Continued)

FOREIGN PATENT DOCUMENTS

AT    211 214 B      9/1960
DE    11 81 613 A   11/1964
(Continued)

OTHER PUBLICATIONS

English translation of the International Search Report issued in PCT/EP2017/054987, dated May 30, 2017.

*Primary Examiner* — Stuart L Hendrickson
(74) *Attorney, Agent, or Firm* — thyssenkrupp North America, LLC

(57) ABSTRACT

A furnace may include at least two vertical shafts, each of which may have at an upper end thereof an inlet for material to be burnt and at a lower end thereof a burnt material outlet. The inlet and the outlet may be connected by a transfer channel. In each case, at least one main burner may be positioned above the transfer channel, and a cooling gas inlet may be positioned below the transfer channel. At least one additional burner may be positioned below the transfer channel in each of the shafts. Such a furnace can be operated such that the material to be burnt in the currently fired shaft is at least partially calcined in a main burning zone above the transfer channel, and then thermally aftertreated in an additional burning zone positioned between the transfer channel and the additional burner.

18 Claims, 2 Drawing Sheets

(51) Int. Cl.
*F27B 1/04* (2006.01)
*F27B 1/20* (2006.01)
*F27B 1/24* (2006.01)
*F27B 1/26* (2006.01)

(56) References Cited

U.S. PATENT DOCUMENTS

| | | | | |
|---|---|---|---|---|
| 5,919,038 A * | 7/1999 | Labelle | ............... | C04B 2/106 |
| | | | | 432/106 |
| 6,735,278 B2 * | 5/2004 | Madsen | ............... | G01N 33/383 |
| | | | | 378/79 |
| 8,340,825 B2 * | 12/2012 | Ledung | ............... | C04B 2/10 |
| | | | | 700/274 |

FOREIGN PATENT DOCUMENTS

| | | |
|---|---|---|
| DE | 3038927 C | 5/1988 |
| EP | 1148311 B | 10/2001 |
| EP | 2478314 A | 7/2012 |
| JP | S61 146741 A | 7/1986 |
| JP | 2002060254 A | 2/2002 |
| JP | 2013513542 A | 4/2013 |
| RU | 2101636 C | 1/1998 |
| RU | 2313501 C | 12/2007 |
| RU | 2353595 C | 4/2009 |
| WO | 2011114187 A | 9/2011 |

* cited by examiner

FURNACE AND METHOD FOR OPERATING A FURNACE

CROSS REFERENCE TO RELATED APPLICATIONS

This application is a U.S. National Stage Entry of International Patent Application Serial Number PCT/EP2017/054987, filed Mar. 3, 2017, which claims priority to German Patent Application No. DE 10 2016 103 937.3, filed Mar. 4, 2016, the entire contents of both of which are incorporated herein by reference.

FIELD

The present disclosure generally relates to furnaces with vertical shafts.

BACKGROUND

Furnaces (see, for example, German Patent Publication No. DE 30 38 927 C2), which are also referred to as co-current/countercurrent/regenerative furnaces or CCR furnaces and are usually used to burn raw materials containing carbonates, in particular limestone, dolomite or magnesite, operate cyclically, wherein burning of the material to be burnt only ever takes place in one of the shafts, while the other shaft operates as a regenerative shaft, in which the material to be burnt or raw material there is preheated in said shaft for the subsequent burning cycle by means of the exhaust gas fed in via the transfer channel from the currently fired shaft. The burning of the material to be burnt in the fired shaft takes place in a co-current mode, in which burning gas produced by burners arranged at the upper end of the shafts flows through the material to be burnt, which is transported through the fired shaft from the top down by the force of gravity. In contrast, a flow through the material to be burnt in the unfired or regeneratively operated shaft takes place in a countercurrent mode, wherein the exhaust gas, which is fed in via the transfer channel—often arranged between the vertical center and the lower third of the shafts—is discharged at the upper end of the regeneratively operated shaft.

Because of the relatively long dwell time of the material to be burnt in the burning zone in combination with the relatively low burning temperatures, usually between 800° C. and 1000° C., conventional CCR furnaces are advantageously suitable for the production of burnt lime with a high reactivity, referred to as soft burnt lime. However, they are not well-suited to the production of burnt lime with a low reactivity, referred to as hard burnt lime, because it is not possible to achieve the substantially complete deacidification—required for this purpose—of the material to be burnt and, furthermore, the sintering required to produce hard burnt lime, for which burning temperatures significantly above 1000° C. (e.g. about 1700° C.) are necessary, generally cannot be achieved by means of a correspondingly increased fuel supply because the burnt material then sinters into lumps owing to the relatively long dwell time in the burning zone that is typical for CCR furnaces, and these lumps can lead to clogging of the furnace, among other problems. In addition, there is the fact that partial recarbonization of the burnt material takes place in the initial section of the cooling zone (situated below the transfer channel) of the fired shaft in conventional CCR furnaces owing to the relatively intensive flow through said material of flue gas coming from the burning zone, which is deflected in this region of the fired shaft in the direction of the transfer channel. With conventional CCR furnaces, degrees of calcination of 96% are the best that are currently possible.

European Patent No. EP 1 148 311 B1 discloses a furnace having a single shaft, which has burners integrated into the side walls of the shaft, wherein the burning gas flows in a countercurrent through the material to be burnt. In a furnace of this kind, the fuel is fed in at the lower end of the burning zone, thereby generally enabling very high burning temperatures to be produced. A furnace of this kind is fundamentally well-suited to the production of hard burnt lime but is not well-suited to the production of soft burnt lime and furthermore has the disadvantage that energy efficiency is significantly lower than that of a CCR furnace.

U.S. Pat. No. 3,771,946 A discloses an embodiment of a double-shaft furnace in which two shafts are connected by two lateral bypass channels. A plurality of additional burners are arranged in the shafts, in each case underneath the bypass channels. These additional burners are only used in the shaft that is operated regeneratively in each case.

Japanese Patent No. JP S61 146741 A shows a double-shaft furnace in which a plurality of additional burners are additionally provided in each of the two shafts, along with a main burner, at the height of an overflow channel. The additional burners assist the calcination of the material to be burnt in a main burning zone comprising the respective main burner.

WIPO Patent Publication No. WO 2011/114187 A1 discloses a single-shaft furnace with a plurality of burners arranged one above the other on altogether two or three levels.

WIPO Patent Publication No. WO 2011/072894 A1 describes a CCR lime furnace in which a parameter of the hot gases that is characteristic of the formation of the length of the flames produced by the burners arranged above an overflow channel is determined by a direct or indirect measurement in the region of the overflow channel and the ratio of fuel to combustion air is controlled in a manner dependent on this parameter in order to set a prescribed flame length.

Thus a need exists for a furnace that enables the production, inter alia, of hard burnt lime with relatively high energy efficiency.

DETAILED DESCRIPTION

Figure 1:
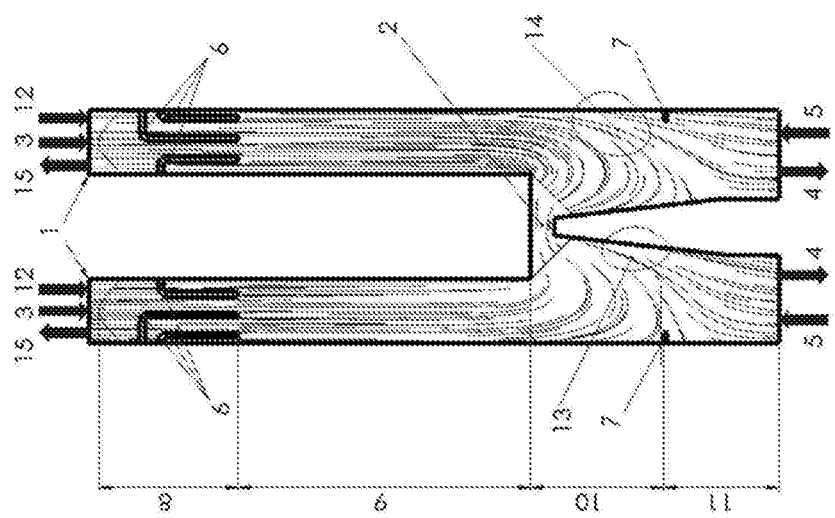
FIG. 1 is a vertical sectional view of an example furnace.

Although certain example methods and apparatuses have been described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to furnaces. In some examples, a furnace may comprise two vertical shafts, each of which has, at the upper end thereof, an inlet for material to be burnt and, at the lower end thereof, a burnt material outlet, and which are connected by means of a transfer channel. At least one main burner, the burning gases of which flow downward in the respective shaft at least as far as the transfer channel in the burning mode, may in each case be provided above the transfer channel, and an inlet for a cooling gas may in each case be provided below the transfer channel. Consequently, in combination with the operation of a main burner in the fired shaft, the downward-flowing burning gas of the main burner or a flue gas containing this burning gas is deflected in the direction of the transfer channel inter alia by the rising cooling gas. The present disclosure furthermore relates to methods for operating such furnaces.

In some respects, the present disclosure is based on the concept of producing hard burnt lime in a furnace which has the fundamental construction and hence also the advantages of a CCR furnace, especially in respect of energy efficiency, wherein provision is made to at least partially calcine the material to be burnt in the respectively fired shaft, in a main burning zone above the transfer channel, in which the burning gas produced by means of (main) burners arranged above this burning zone flows through the material to be burnt as a co-current, and then to thermally aftertreat the burnt material in an additional burning zone, which below the transfer channel and thus, in particular, in a section of the respective shaft which corresponds in a conventional CCR furnace to the initial section of the cooling zone, by means of additional burners arranged in said additional burning zone. Here, the thermal aftertreatment can comprise, in particular, sintering of the calcined burnt material, thereby making it possible to achieve the correspondingly low reactivity (t60>2 min., in particular t60>>2 min.) that is characteristic of hard burnt lime.

Since the flow through the burnt material in this additional burning zone is countercurrent flow, the dwell time of the burnt material in the additional burning zone is sufficiently short to ensure that the relatively high burning temperatures that are required for sintering can be achieved through a correspondingly high fuel feed rate to the additional burners of the additional burning zone without this leading to a significant extent to sintering of the burnt material into lumps. Furthermore, this also avoids intensive flow of the flue gas coming from the main burning zone through the burnt material, thereby making it possible to prevent the recarbonization known from conventional CCR furnaces.

In accordance with this basic concept, a furnace is provided which comprises at least two vertical shafts, each of which has, at the upper end thereof, an inlet for material to be burnt for feeding in the material to be burnt and, at the lower end thereof, a burnt material outlet for the removal of the burnt material, and which are furthermore connected by means of a transfer channel, wherein at least one main burner is in each case provided above the transfer channel. Here, the configuration of the furnace overall and, in particular, of the main burners is chosen in such a way that, in the burning mode, the burning gases thereof flow downward in the respective shaft at least until they reach the transfer channel and hence in a co-current with the material to be burnt which is to be transported, in particular by the force of gravity, from the inlet for material to be burnt to the burnt material outlet. Moreover, a cooling gas inlet is in each case provided in the furnace below the transfer channel, with the result that, in combination with the operation of the main burner in the fired shaft, the downward-flowing burning gas of the main burner or a flue gas containing the burning gas, which furthermore contains carbon dioxide released by calcination of the burnt material, is deflected inter alia by the rising cooling gas in the direction of the transfer channel. At least one additional burner is arranged below the transfer channel in each of the shafts, by means of the operation of which the envisaged implementation of an additional burning zone below the transfer channel is made possible. In this case, provision is made for the additional burner or burners to be operated only in the fired shaft or in both shafts. For possibly fully automatic performance of a method of this kind, the furnace according to the present disclosure accordingly comprises a control device which provides an operating state in which the additional burner or burners is/are operated only in the fired shaft or in both shafts. By means of simultaneous operation of the additional burners in both shafts, a particularly good temperature distribution can be achieved in the additional burning zone of the fired shaft, and therefore this manner of operating a furnace according to the present disclosure or such an operating state of the furnace according to the present disclosure is preferred.

According to the present disclosure, the designation of the shafts of the furnace according to the present disclosure as "vertical" does not necessarily require that said shafts or the longitudinal axes thereof also have a precisely vertical alignment. On the contrary, a precisely vertical directional component of the alignment should be sufficient, wherein, with a view to advantageous gravitational transportation of the material to be burnt, an angle between the actual alignment and the precisely vertical alignment of at most 30°, preferably at most 15° and particularly preferably, as far as possible 0° (precisely vertical alignment), should be provided.

A method according to the present disclosure for operating a generic furnace envisages that the material to be burnt in the currently fired shaft is at least partially calcined in a main burning zone, which is arranged above the transfer channel and in which the burning gas produced by means of main burners arranged above this burning zone flows through the material to be burnt as a co-current, and the burnt material is then thermally aftertreated in an additional burning zone, which is arranged between the transfer channel and the respective additional burner and in which the burning gas produced by the respective additional burner flows through the burnt material as a countercurrent. In this case, the additional burner or burners is/are operated only in the fired shaft or in both shafts.

In this case, the thermal aftertreatment can comprise, in particular, sintering the burnt material, thereby making it possible to produce burnt material with a relatively low reactivity and thus, in particular, to produce hard burnt lime.

In another preferred embodiment of the method according to the present disclosure, provision can be made, by means of control of the input of thermal energy via the main burners and the additional burners, for the material to be burnt in the main burning zone to be calcined only partially in respect of a target value for the degree of calcination, which can be substantially 100% but also less, and for the burnt material finally to be calcined in the additional burning zone with respect to this target value for the degree of calcination. If sintering in the additional burning zone is provided in addition, such final calcination owing to the endothermal effect can serve, in particular, to keep to a relatively low level the temperature of the exhaust gas passed via the transfer channel, despite the relatively high temperature level (of, for example, about 1700° C.) required for sintering in the additional burning zone. It is thereby possible, in particular, to protect the transfer channel from thermal overloading and/or to keep down the construction outlay for a heat protection lining of the furnace, and, in particular, the transfer channel.

However, the furnace according to the present disclosure also enables the production of substantially fully calcined burnt material without said material also being sintered in the additional burning zone. In this way, it is possible, for example, to produce burnt lime of high reactivity ($t60<2$ min.), i.e. soft burnt lime, and with a high degree of calcination (>99%). There is likewise the possibility of advantageously producing lump lime with a small fine fraction in the lime coming from the furnace.

In some examples, provision can be made for the additional burners to be integrated into a side wall of the respective shaft. On the one hand, this represents a structurally advantageous possibility for the integration of the side burners. It is furthermore possible in this way to achieve a temperature distribution within the additional burning zone which is as advantageous as possible. This applies especially when a plurality of additional burners is provided in each shaft, said burners furthermore preferably being arranged in a manner distributed as uniformly as possible over the circumference or the respective side wall of the shaft and/or being arranged in different ways in respect of the distance thereof from a center (in particular a central plane in the case of a non-round cross-sectional shape of the shafts or a longitudinal axis in the case of a round cross-sectional shape of the shafts) of the respective shaft.

For as good as possible temperature distribution within the additional burning zone, especially also in a manner dependent on the respective material to be burnt, provision can preferably be made for the distance between the additional burners and a center of the respective shaft to be variable, in particular also after installation. For this purpose, the additional burners can be in the form of burner lances, for example, which are mounted in such a way as to be movable (along the longitudinal axis thereof) in through openings in the side walls of the shafts.

In other examples, provision can be made for the additional burners to be arranged within the upper two thirds, the upper half or in the upper third of that section of the respective shaft which lies below the transfer channel. As a result, they can be situated, in particular, in that section of the fired shaft in which the deflection of the flow of the burning gas stemming from the main burner or burners or of the flue gas containing this burning gas in the direction of the transfer channel occurs. In this way, recarbonization of the burnt material can be suppressed in an effective manner by means of the additional burners or the additional burning zone produced by said burners in the fired shaft and, at the same time, the length of the additional burning zone can be kept so small that the dwell time of the burnt material within the additional burning zone is so short, despite the high burning temperatures made possible by the additional burners, that sintering of the burnt material into lumps is prevented in an effective manner.

As a further preference, provision can be made for a plurality of additional burners to be arranged at different heights, preferably up to three different heights, (distribution along the longitudinal directions of the shafts) in each of the shafts. This too can likewise help in achieving a temperature distribution which is as advantageous as possible within the additional burning zone.

The shafts of the furnace according to the present disclosure can preferably have a round and, in particular, circular, or quadrilateral, in particular rectangular, polygonal or square cross-sectional shape. Other cross-sectional shapes, in particular other angled cross-sectional shapes, can likewise advantageously be implemented, however.

The furnaces shown in the drawings each comprise two vertically aligned shafts 1, which are connected to one another by means of a transfer channel 2 arranged approximately at the level of the lower third of the longitudinal or vertical extent of the shafts. Each of the shafts 1 has, at the upper end thereof, in particular in the upper end face, an inlet 3 (not shown in detail) for material to be burnt, which is of closable design. Each of the shafts 1 furthermore has, at the lower end thereof, in particular in the lower end face, a burnt material outlet 4 (likewise not shown in detail), which is likewise of closable design. Furthermore, each of the shafts 1 is provided with a cooling gas inlet 5, which is arranged in the region of the lower end and, in particular, can be integrated into the respective lower end face. In the region of the upper end, each of the shafts 1 comprises a plurality of main burners 6, which can comprise, for example, burner lances which are passed via the respective side wall into the associated shaft interior and are formed with an angle of approximately 90° therein and the burner openings of which are, as a result, aligned in the direction of the lower end of the respective shaft 1. Each of the shafts 1 furthermore comprises one additional burner 7 (see FIGS. 1 and 2) or a plurality of additional burners 7 (see FIGS. 3 to 5), wherein a plurality of additional burners 7 in each shaft 1 is arranged in a manner distributed in a plurality of planes, in this case specifically to horizontal planes, in a section of the respective shaft 1 which adjoins the transfer channel 2, directly below said channel. The additional burners 7 are likewise in the form of burner lances, which are passed via the side walls of the shafts 1 into the shaft interiors, wherein, in this case, a straight profile is envisaged for the burner lances, not an angled configuration. It would also be possible to provide the burner lances 7 in such a way that they slope upward or downward at a certain angle. This would result in a horizontal or obliquely upward or obliquely downward sloping alignment of the additional burners 7 in contrast to the vertical alignment of the main burners 6 and the upper part of the individual shafts 1.

During the operation of one of the furnaces shown, material to be burnt is transported continuously or intermittently, either in the fired shaft 1 or in the regenerative shaft or simultaneously in both shafts, from the inlet 3 for material to be burnt, situated at the top, to the burnt material outlet 4 by virtue of controlled removal via the associated burnt material outlet 4. During this process, the material to be burnt is initially passed through a preheating zone 8, which extends between the inlet 3 for material to be burnt and (approximately) the burner openings of the main burners 6 and in which preheating of the material to be burnt is supposed to take place, then through a main burning zone 9, which extends approximately from the burner openings of the main burners 6 to the level of the transfer channel 2. Starting from the transfer channel 2, there is an adjoining additional burning zone 10, which merges into a cooling zone 11 approximately at the level of the (lower plane) of the additional burner or burners 7. During the transportation of the material to be burnt through these individual zones, the individual particles are thus initially preheated in the preheating zone 8, then burnt in the main burning zone 9 and, during this process, are precalcined until a defined degree of calcination is achieved, this being lower than a degree of calcination which is ultimately envisaged for the burnt material to be produced. The individual particles of the burnt material are then burnt again in the additional burning zone 10 and, during this process, are finally calcined, i.e. until the degree of calcination envisaged for the burnt material to be produced is reached, and optionally also sintered. Finally, in the cooling zone 11, the burnt material is cooled by means of the cooling gas, which, in particular, can be air.

Figure 2:
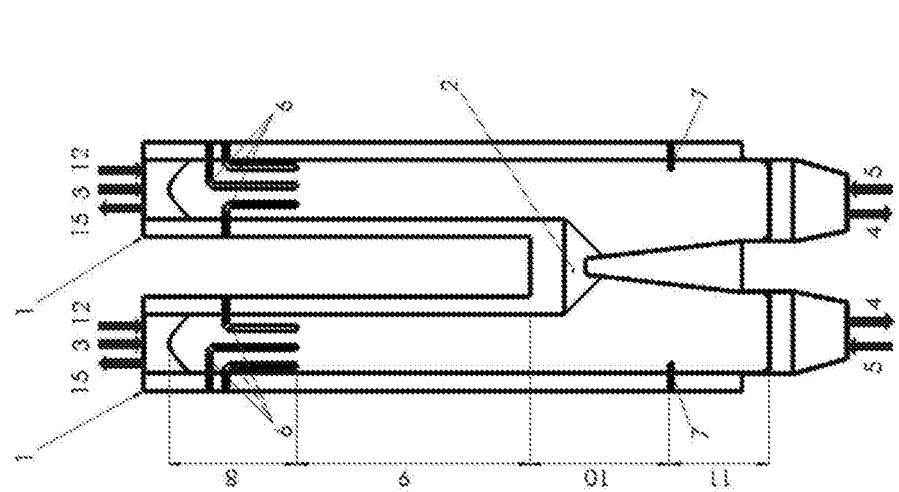
FIG. 2 is a side sectional view of flow conditions in the example furnace shown in FIG. 1 during a burning mode of a shaft.
Figure 3:
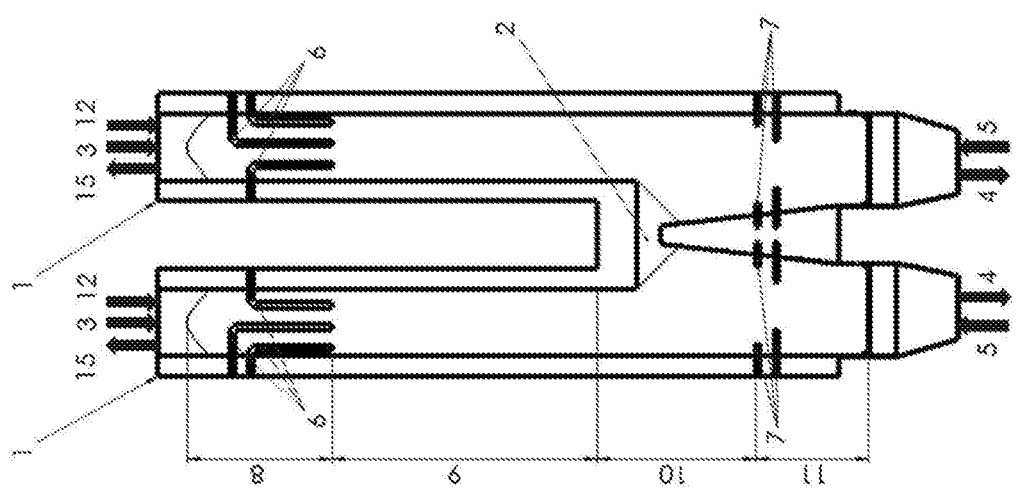
FIG. 3 is a vertical sectional view of another example furnace.

The burning of the material to be burnt in the main burning zone 9 and the additional burning zone 10 of the fired shaft 1 is achieved through the production of thermal energy by means of the main burners 6 and the additional burners 7 by supplying said burners with liquid, gaseous or powdered fuel. This fuel emerges from the front ends of the main and additional burners 6, 7 and burns there with a combustion gas (in particular air). In this case, the combustion gas can be fed in separately via a burning gas inlet 12, as shown in FIGS. 1 to 3 for the main burning zone. Supply via the burner lances themselves is also possible, and this can be envisaged particularly for the additional burners 7.

The consumption by the additional burner or burners 7 in the fired shaft 1 of combustion gas ("primary air") fed in via said burner or burners is relatively low because the cooling gas fed in from below, which can likewise be air, can be used additionally or primarily by said burner or burners to convert the fuel. Another result of this is that a furnace according to the present disclosure produces no more exhaust gas or only insignificantly more exhaust gas (in terms of volume) than a conventional CCR furnace, despite the additional burners 7.

In the case of a conventional CCR furnace, which does not comprise the additional burners 7 according to the present disclosure, the flue gas formed during the calcination of the material to be burnt in the (main) burning zone 9, which is composed substantially of the burning gas produced by the (main) burners 6 and carbon dioxide released during the calcination of the material to be burnt, would come together, from the level of the transfer channel 2 and in a section adjoining the latter, which can amount to up to a third or half the longitudinal or vertical extent of the cooling region 11 for example (this would comprise the additional burning zone 10 in a conventional CCR furnace), with the cooling gas which flows through the burnt material in an upward direction, starting from the cooling gas inlet 5. As a result, the flue gas would be deflected in the direction of the transfer channel 2 and, owing to the lower pressure within the regeneratively operating shaft, would flow across into this regeneratively operated shaft via the transfer channel 2 together with the cooling gas. During this process, there would still be a considerable flow of flue gas stemming from the burning zone through at least some of the burnt material in this section situated below the transfer channel, and this would lead to recarbonization owing to the already significantly reduced temperatures there, as a result of which the degree of calcination achieved in the burning zone 9 would be reduced again. In this case, such recarbonization can take place especially in the edge zones of this section.

Such recarbonization is avoided inter alia by means of the arrangement according to the present disclosure of the additional burners 7 and of the additional burning zone 10 produced by the operation thereof, because in this way the temperature, inter alia in the particularly relevant regions 13 and 14 below the transfer channel 2 (see FIG. 2), is held sufficiently high. In addition, it is possible, by means of the additional burner or burners 7 in the additional burning zone 10 of the fired shaft 1, to produce such high burning temperatures that almost complete calcination of the burnt material can be achieved without the occurrence of sintering of the particles of the burnt material into lumps to a significant extent, which could lead to clogging of the furnace. This is attributable essentially to the countercurrent flow through the burnt material in the region of the additional burning zone 10, thereby making it possible to achieve a sufficiently high heat transfer, despite relatively short dwell times of the particles of the burnt material within the additional burning zone 10.

The flue gas flowing across into the regeneratively operated shaft 1 from the fired shaft 1 via the transfer channel 2 in a furnace according to the present disclosure, which is then composed substantially of the burning gases from the main burners 6 and the additional burner or burners 7, of the carbon dioxide released during the calcination of the material to be burnt in the main burning zone 9 and the additional burning zone 10, and of the cooling gas 5 of the fired shaft 1, flows through the material to be burnt arranged within the regeneratively operated shaft 1 above the transfer channel 2 in order to preheat said material for burning in a subsequent cycle in the operation of the furnace, in which the previously fired shaft 1 is operated regeneratively and the previously regeneratively operated shaft 1 is fired. During this process, the flue gas which has flowed across mixes to a greater or lesser extent with cooling gas which has been fed to the regeneratively operated shaft 1 via the associated cooling gas inlet 5. In the case of a conventional furnace, the problem with this can be that the cooling gas flows through the regeneratively operated shaft 1 primarily at the edges because it is displaced by the flue gas flowing in from the fired shaft 1 via the transfer channel 2. This leads to relatively sharp cooling of the region indicated by the reference sign 14 in FIG. 2, in which there would be increased recarbonization of the burnt material in a subsequent cycle, in which this shaft 1 would then be fired. In the case of a furnace according to the present disclosure, such recarbonization can be prevented in a particularly effective manner if the additional burner or burners 7 is/are also operated, possibly to a reduced extent, when the respective shaft is operated regeneratively because then correspondingly sharp cooling in this region 14 is prevented. After flowing through the material to be burnt above the transfer channel 2, the furnace exhaust gas (consisting of the flue gas stemming from the fired shaft 1 and the cooling gas fed into the regeneratively operated shaft) is discharged via an associated exhaust gas outlet 15.

Figure 4:
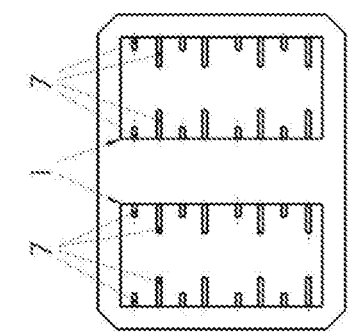
FIG. 4 is a top horizontal sectional view of the example furnace shown in FIG. 3 having shafts with rectangular cross sections.
Figure 5:
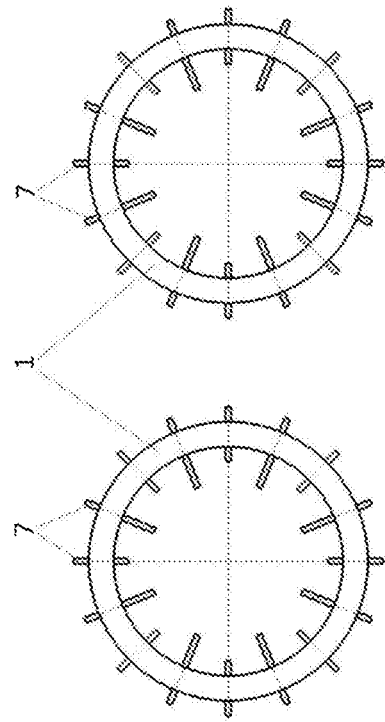
FIG. 5 is a top horizontal section view of the example furnace shown in FIG. 3 having shafts with circular cross sections.

For the two illustrative furnaces according to the present disclosure which are shown in FIGS. 1 to 3 merely by way of example, quadrilateral and, in particular, rectangular, polygonal or round and, in particular, circular cross-sectional shapes can be provided for both shafts 1, for example, as shown in FIGS. 4 and 5.

FIGS. 4 and 5 furthermore show other possible horizontal arrangements of the additional burners 7 of a furnace shown in FIG. 3, which are arranged in two horizontal planes. According to this, it is possible in the case of a furnace shown in FIG. 3 having a rectangular cross-section of the shafts 1 (see FIG. 4), for example, to provide for a distribution of the plurality of additional burners 7, in the specific case sixteen burners, in the two horizontal planes in which the eight additional burners 7 in each plane are arranged in just two opposite side walls, in particular the side walls facing and facing away from the respective other shaft 1, wherein these burners are arranged in a uniformly distributed manner over substantially the entire width of the respective side wall, for example. In the case of a furnace shown in FIG. 3 having a circular cross section of the shafts 1 (see FIG. 5), an arrangement of the radially aligned burner lances of the additional burners 7 over the circumference of the circular cross section at a uniform pitch in the two horizontal planes is likewise provided. In both illustrative embodiments, it is shown that the individual additional burners 7 in the two horizontal planes have a lateral offset relative to one another which corresponds approximately to half the distance between two additional burners 7 in the same plane. It is likewise possible for two additional burners 7 in the two horizontal planes to be arranged substantially exactly one above the other in each case. It is also possible to make the lateral offset smaller.

The additional burners 7 can also project by different amounts into the respective shaft interior and can thus be at different distances from the respective center of the individual shafts 1. FIGS. 4 and 5 show that the additional burners 7 in the individual horizontal planes are at substantially the same distance from a center of the respective shaft 1. In this case, the center of a shaft 1 in the case of a furnace shown in FIG. 4 is defined by the vertical center plane (which contains the longitudinal axis of the respective shaft 1), which extends parallel to the side walls incorporating the additional burners 7, and, in the case of a furnace shown in FIG. 5, is defined by the longitudinal axis of the respective shaft 1. It is furthermore envisaged that the distance between the additional burners 7 (more specifically the burner openings thereof) and the respective center is in each case smaller in the upper horizontal plane than in the lower horizontal plane. There is also the possibility of correspondingly reversing this arrangement and/or providing different distances for the additional burners in the individual horizontal planes.

What is claimed is:

1. A furnace comprising:
   at least two vertical shafts,
   a transfer channel connecting the at least two vertical shafts;
   each of the at least two vertical shafts including
      an inlet for receiving material to be burnt, the inlet being disposed at an upper end of the vertical shaft,
      an outlet for burnt material, the outlet being disposed at a lower end of the vertical shaft,
      a main burner disposed above the transfer channel,
      a cooling gas inlet disposed below the transfer channel,
      an additional burner disposed below the transfer channel; and
   a control device configured to produce a first operating state in which the additional burner of only a fired shaft of the at least two vertical shafts is operated and a second operating state in which the additional burner of both of the at least two vertical shafts is operated,
   wherein the additional burner is configured so as to be movable with respect to each of the at least two vertical shafts to produce a variable distance between the additional burner and a center of the respective vertical shaft.

2. The furnace of claim 1 wherein the additional burner of each of the at least two vertical shafts is integrated into a side wall of the respective vertical shaft.

3. The furnace of claim 1 wherein with respect to each of the at least two vertical shafts the additional burner is disposed within an upper two-thirds of a section of the respective vertical shaft that lies below the transfer channel.

4. The furnace of claim 1 wherein with respect to each of the at least two vertical shafts the additional burner is disposed within an upper half of a section of the respective vertical shaft that lies below the transfer channel.

5. The furnace of claim 1 wherein with respect to each of the at least two vertical shafts the additional burner is disposed within an upper third of a section of the respective vertical shaft that lies below the transfer channel.

6. The furnace of claim 1 wherein the additional burners are disposed at different heights within each of the at least two vertical shafts.

7. The furnace of claim 1 wherein a cross-sectional shape of each of the at least two vertical shafts is round.

8. The furnace of claim 1 wherein a cross-sectional shape of each of the at least two vertical shafts is polygonal.

9. The furnace of claim 1 wherein a cross-sectional shape of each of the at least two vertical shafts is quadrilateral.

10. A method for operating a furnace comprising at least two vertical shafts and a transfer channel that connects the at least two vertical shafts, each of the at least two vertical shafts including an inlet for receiving material to be burnt, the inlet being disposed at an upper end of the vertical shaft; an outlet for burnt material, the outlet being disposed at a lower end of the vertical shaft, a main burner disposed above the transfer channel; a cooling gas inlet disposed below the transfer channel; and an additional burner disposed below the transfer channel, the method comprising:
   at least partially calcining the material to be burnt in a fired shaft of the at least two vertical shafts in a main burning zone above the transfer channel at a first temperature and according to a first dwell time; and
   thermally aftertreating in an additional burning zone the material that has been at least partially calcined, the additional burning zone disposed between the transfer channel and the additional burner producing a second temperature, the second temperature being greater than the first temperature and according to a second dwell time, the second dwell time being less than the first dwell time,
   wherein the additional burner of one or both of the at least two vertical shafts is/are operated only in the fired shaft or in both of the at least two vertical shafts.

11. The method of claim 10 comprising sintering the burnt material in the additional burning zone.

12. The method of claim 10 wherein the material to be burnt is only partially calcined in the main burning zone and is finally calcined in the additional burning zone.

13. The method of claim 10 wherein the additional burner of each of the at least two vertical shafts is integrated into a side wall of the respective vertical shaft.

14. The method of claim 10 comprising, with respect to each of the at least two vertical shafts, varying a distance between the additional burner and a center of the respective vertical shaft.

15. The method of claim 10 wherein with respect to each of the at least two vertical shafts the additional burner is disposed within an upper two-thirds of a section of the respective vertical shaft that lies below the transfer channel.

16. The method of claim 10 wherein the additional burners are disposed at different heights within each of the at least two vertical shafts.

17. The method of claim 10 comprising generating at least 99% calcined hard burnt lime with a t60>2 minutes.

18. The method of claim 10 comprising generating at least 99% calcined soft burnt lime with a t60<2 minutes.

* * * * *